April 26, 1960 E. DYKE 2,934,645
AUTOMATICALLY TUNED MICROWAVE SYSTEM
Filed Feb. 17, 1958
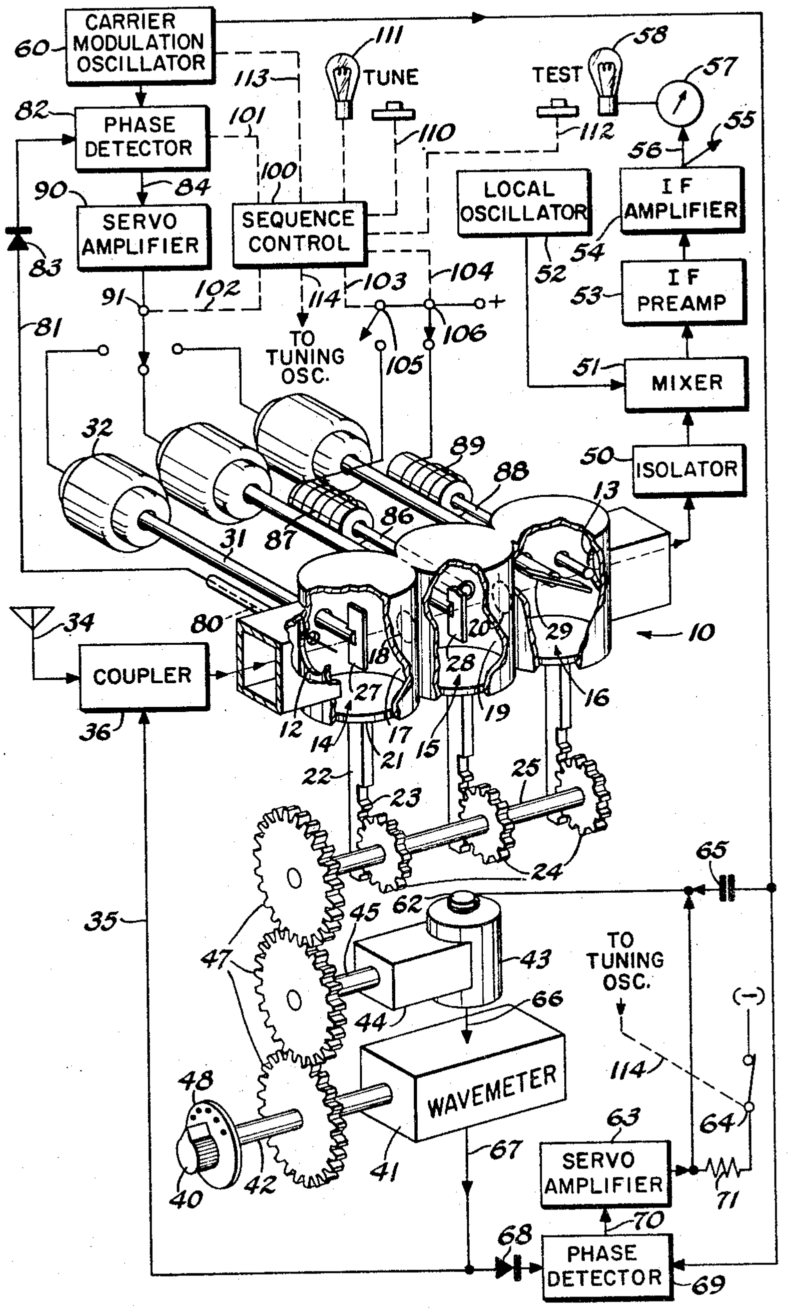
INVENTOR.
EDWIN DYKE
BY Marvin Moody
ATTORNEY United States Patent Office 2,934,645
Patented Apr. 26, 1960

2,934,645

AUTOMATICALLY TUNED MICROWAVE SYSTEM

Edwin Dyke, Dallas, Tex., assignor to Collins Radio Company, Cedar Rapids, Iowa, a corporation of Iowa Application February 17, 1958, Serial No. 715,757

3 Claims. (Cl. 250—40)

This invention relates in general to automatically tuned systems and more particularly to automatically tuned systems for use in microwave radio equipment.

Prior art methods in ganged, calibrated tuning in the microwave frequencies, such as at eight thousand megacycles, have involved precision linkages for adjusting the tuning elements of the various sections working at that frequency. Before this invention, the mechanical linkages in use were adequate for virtually any purpose. At the time of this invention, however, higher accuracy and resetability in tuning the microwave frequencies were required. The precision necessary in the adjustments called for such close tolerances that even "micro-inch" finishes on the parts in the mechanical linkage were required in order to maintain the desired performance. It became obvious that a new systemic approach was necessary, rather than mere refinement of the old method.

Accordingly, the object of this invention is to provide a very high frequency tuner capable of adjusting its frequency precisely despite variations in mechanical and electrical constants.

It is a further object of this invention to provide a system which tunes itself to peak efficiency regardless of temperature or humidity variation, or mechanical variations.

It is a feature of this invention that a prevision wavemeter is adjusted together with the coarse tuning of the filter section. The adjustment of the wavemeter sets the frequency of a tuning oscillator which is used to establish a local, desired carrier. A servo tuning system then tunes the various sections of the filter in sequence to the local carrier.

It is a further feature of this invention that microwave filters of any degree of complexity may be used to provide the necessary bandwidth, selectivity and impedance characteristics desired with no need for complicated or precise mechanical tuning linkage.

It is a further feature of this invention that the state of tuning can be rechecked virtually instantaneously at any time during operation of the system.

Further objects, features, and advantages of the invention will become apparent from the following description and claims when read in conjunction with the drawing, in which:

The figure shows an isometric drawing of the mechanical portion including the cavity filter, and a block diagram of the accompanying electrical system.

In the figure, a filter 10 has an input iris 12 between an input waveguide and the first section of the filter, and an output iris 13 connecting the last filter section into an output waveguide. The filter consists of three cylindrical cavities 14, 15 and 16 with common sidewalls carrying irises separating the various cavities. Wall 17 carries iris 18 and wall 19 carries iris 20. It is to be noted that irises 18 and 20 are smaller than irises 12 and 13 in accord with well-known principles of iris coupling cavities in order to provide control of the Q and therefore the bandwidth of the various cavities. In this instance, cavity 15 has a higher Q than either of the end cavities.

One of the ends of the cavities is in the form of a moving plunger. Cavity 14 has a plunger 21 closing the cavity and by motion in and out of the cavity, varying the resonant frequency. Plunger 21 is supported on a rod 22 having a rack 23 formed on the outward end. The other cavities have like plunger control rod and rack arrangements. The three plungers shown are all arranged in a similar manner so as to provide a ganged coarse tuning of the filter. Each of the racks is coupled to a tuning shaft 25 by spur gears 24. These spur gears couple the plungers to the tuning shaft 25.

As a consequence of the invention, the mechanical accuracy required of the shaft 25 in the tuning of the system need be no better than available in usual prior art tuning and, in fact, may be considerably less precise when full advantage of the invention is made.

In each cavity, tuning vanes are mounted on a fine tuning shaft. Cavity 14 has tuning vane 27, cavity 15 has tuning vane 28 and cavity 16 has tuning vane 29. These tuning means are independently turned by their shafts to adjust the resonant point of the cavity to as fine a degree as necessary. Coupled to the fine tuning shaft 31 is a servo motor 32, geared down as necessary to accomplish the purpose. Each of the fine tuning shafts is shown controlled by separate servo motors. It is possible that a single motor might be used in servo-setting the fine-tuning vanes by controlling clutches coupling each of the shafts alternately instead of switching the motor power circuit, as shown.

Since the microwave tuning problem arose in a receiver system, the system incorporating the invention is shown as a receiver. It is obvious, however, that the invention may be applied to any microwave tuning system. In the figure, an antenna 34 is connected to waveguide or other means through iris 12 to the first filter section 14. Between antenna 34 and iris 12, and another line 35, is a coupler 36. This coupler is a directional coupler which couples the voltage on line 35 to the input of the filter system with preferably little radiation appearing on antenna 34. This coupling is performed without disturbance of the through coupling of antenna 34 to the filter. In instances where this arrangement provides excessive radiation, a switch controlled by the sequence control 100, which will be discussed below, may be used to disconnect and ground the antenna 34 and connect line 35 for testing purposes, then connect line 34 to the filter input and ground line 35 for operation as a receiver.

The manual adjustment of frequency of the system is controlled by a knob 40. This knob sets the frequency of a wavemeter 41, which is in effect a precision-calibrated cavity capable of reset accuracy equal to that desired for the system. In various uses, the wavemeter has had Q's of approximately eleven hundred to several thousand. Shaft 42 couples knob 40 to wavemeter 41.

The tuning oscillator is a klystron or other equivalent oscillator capable of control in accord with the invention. Here, the tuning oscillator is a klystron 43 having a mechanically tunable cavity 44. This cavity is tuned by a shaft 45 to approximately the frequency desired. Gears 47 couple the coarse tuning shaft 25 of the filter system and the coarse tuning shaft 45 of the klystron oscillator 43 to the tuning shaft 42 of the wavemeter. Thus, coarse tuning of the filter and the oscillator, and the precise frequency setting of the wavemeter as desired are all adjusted simultaneously upon manual adjustment of the knob 40 against the calibration of the dial 48, calibrated in terms of the desired frequency of operation of the receiver.

The output of the filter 10 is connected by coupling through iris 13 to an isolator 50. This isolator is a ferrite rotator or other similar "one-way" device which greatly reduces reflection back through iris 13 of any mismatch set up by the balanced mixer 51. Consistent with the application of the invention to a receiver, a local oscillator 52 feeds the mixer 51 to produce an intermediate frequency. This is fed into the intermediate-frequency preamplifier 53 and the intermediate-frequency amplifier 54 for further application by lead 55 to audio or video detectors or such other equipment as may be applied to this system. Through lead 56 a signal is applied to a detector 57 which is tuned to the frequency of the carrier modulation oscillator 60. Upon the receipt of sufficient amplitude of the carrier modulation, test light 58 is energized to show that the system is operative.

The system relies on two servo loops, primarily, for its high precision. Each of these servos relies on the carrier modulation oscillator 60 to provide a reference phase voltage for detecting tuning errors.

The first loop is the tuning oscillator control loop. As is well known, the direct repeller voltage of a klystron may be controlled to determine the precise frequency desired. In exercise of this invention, the repeller 62 of klystron oscillator 43 has applied to it the output voltage of the servo amplifier 63. The direct operating voltage is controlled by a switch 64 closed by the sequence control 100. The alternating carrier modulation voltage is impressed on the operating voltage through a capacitor 65. The high frequency output 66 of the klystron is applied to the wavemeter 41. A voltage is picked off by lead 67 from the wavemeter. This voltage is rectified by a sharply tuned microwave amplitude modulation detector 68 to produce an amplitude modulated voltage which is applied to phase detector 69. Detector 68 generates only second harmonics of the carrier modulation from oscillator 60. The system ignores these harmonics. Away from resonance, detector 68 acts as a slope-type discriminator, detecting the modulation of the carrier modulation imposed on the klystron oscillator 43. The output of this slope detection increases from the resonance point with increasing detuning.

The modulation voltage taken from the wavemeter is compared to the original carrier modulation from the carrier modulation oscillator 60. The output 70 of the phase detector 69 is a voltage which indicates the deviation, by amplitude and polarity, of the carrier frequency of klystron 43 from the resonant peak of the wavemeter. This voltage is amplified by servo amplifier 63 and impressed on the repeller supply voltage through modulation on resistor 71. Thus the tuning oscillator provides an output 67 which is set to a very high precision with little more error than that of setting the wavemeter. The only requisite is that the gain of servo amplifier 63 be high enough. The output 67 of wavemeter 41 is also connected to line 35 for connection to the input of the filter system by either a directional coupler or switch as discussed earlier.

The other servo loop of the invention is somewhat larger in scope. This loop starts with a wire probe 80 inserted in the first cavity 14. This probe senses the voltage in the cavity, coupling out some of the voltage. Line 81 connects probe 80 to a phase detector 82. Detector 83 is shown schematically in line 81 to symbolize the rectifier used at the probe 80. This detector recovers the amplitude modulation present in the cavity. Detector 83 is similar to detector 68. The amplitude modulation sensed by probe 80 is applied to phase detector 82. Voltage from the carrier modulation reference oscillator 60 is also applied to phase detector 82. The result of this phase comparison is an output voltage 84 which has polarity and amplitude proportional to the tuning error existing in the filter system. The tuning error sensed, however, is thus far dependent on the entire filter system.

In order to tune any one cavity independent of reflection from a succeeding cavity, each cavity following the first cavity is provided with a detuning means in the form of a plunger 86. Thus, cavity 15 has a tuning plunger 86 which is shown withdrawn from the cavity. A solenoid 87 actuates plunger 86. Deenergized, a spring means pulls the plunger from the cavity. Cavity 16 has plunger 88 which is shown inserted because of energization of its solenoid 89. In the tuning sequence, it is noted that cavity 15 has just been tuned.

The output 84 of the tuning phase detector 82 is then applied to a servo amplifier 90 and to a servo motor. In the form of the invention shown, the servo amplifier is applied to the related servo motor through a switch 91. This switch 91 applies the output voltage of servo amplifier 90 to the particular servo motor being actuated. In the event that the signal servo motor is used with clutching or other control of the fine tuning shafts 31, then switch 91 may be utilized in control of the clutches or other coupling devices working on shafts 31.

Operation of control 100 determines the sequence of operation of the entire tuning system. One line 101 of this sequence control controls the polarity of the phase detector 82 so that the phase reference applied to the detector is shifted 180° in phase as the tuning operation is transferred from one cavity to a succeeding cavity. This provides for proper operation of the tuning servo in that the phase sensing function is present across the entire operational band to provide null output from servo amplifier 90 in response to proper tuning of successive cavities. Further, by use of phase, the tuning servo is always started in the right direction for tuning with a minimum running time.

The output of the phase detector 82 is connected to the servo amplifier 90. The sequence control, through line 102, actuates switch 91 to couple the servo amplifier 90 to the particular fine tuning means being controlled, here the motor controlling vane 28 in cavity 15. Simultaneously, through lines 103 and 104, either solenoid 89 or both 87 and 89 are maintained energized by control of switches 105 and 106 to actuate the detuning means in the cavities next following the section being tuned.

The sequence control is actuated by a button labelled "tune" through line 110. At the time the sequence of tuning and testing is started, a tuning light 111 is energized by a line to indicate that the system is in the process of tuning itself. A test button and line 112 actuates a portion of the sequence control, as will be understood later, to merely test the system for its operativeness and being tuned. A line 113 couples the sequence control to the reference oscillator 60 for energization of that oscillator. Similarly, an energizing line 114 extends from the sequence control to the tuning oscillator switch 64.

In operation, the user of the receiver embodying the invention adjusts the desired frequency of reception by the shaft 42. Here knob 40 is set on dial 48 to the precise frequency desired. This adjusts wavemeter 41 to the operating frequency desired. Concurrently with the adjustment of wavemeter 41, the coarse frequency adjustment of the klystron oscillator 43 and of the multisection filter 10 is adjusted. These coarse adjustments may not be able to set the various cavities to closer than ten megacycles of the desired frequency.

Upon the adjustment of the wavemeter 41, the phase of the carrier modulation reference oscillator 60 applied to the repeller 62 appears in error as seen by phase detector 69. The error appears at output 70, is amplified by servo amplifier 63 to control the repeller voltage by variation of the voltage drop across resistor 71. This adjusts the voltage at repeller 62 to eliminate the error. Measurements of the system in operation indicate so little error in this tuning as to be undiscernible by present ordinary microwave methods. The exact frequency at which the system is to be tuned now appears on line 35. This exact frequency is held constant with reference to that of the wavemeter 41. This voltage is coupled into the input 12 of the filter 10.

Since the sequence control 100 which may comprise a timer that controls switching circuits is arranged to start at the beginning of the tuning cycle, actuation of the "tune" control 110 completes a circuit through switch 91 to energize the first tuning motor 32. Solenoids 87 and 89 are also energized by closure of switches 105 and 106. The error present at probe 80 is that due to the mistuning of cavity 14 only, the remaining cavities or sections in the system being detuned by the detuning means 86 and 88. The voltage sensed by probe 80 is recified and the carrier modulation is applied to phase detector 82. Comparison to the carrier modulation oscillator reference voltage 60 yields an error signal at 84 which actuates the servo amplifier 80 and motor 32, to correct the position of the fine tuning shaft 31. Vane 27 is thus positioned to tune the first cavity to the frequency of the signal generated by klystron oscillator 43 as determined by the setting of wavemeter 41. A predetermined short time later sequence control 100 shifts the polarity of the output at phase detector 82, moves the switch 91 to the second fine tuning shaft, and deenergizes solenoid 87 by opening switch 105.

Cavity 15 is now ready to be tuned since the cavity immediately preceding it is tuned, in order of tuning, and the cavity immediately following it, in order of tuning, is detuned. Any error of tuning of cavity 15 will appear at probe 80 as a phase shift of the modulation of oscillator 43. This servo action adjusts vane 28 so as to tune cavity 15 to resonance at the frequency of the signal that is applied to line 35. The system is illustrated at this point of operation.

Again, a short, predetermined time later the polarity of the phase detector 82 is reversed by line 101. Switch 91 is moved over to connect in the following cavity servo; detuning solenoid 89 is deenergized by the opening of switch 100, removing the detuning plunger. As with cavity 15, any error of tuning in cavity 16 reflects back through the filter chain to the probe 80. This error is detected by phase detector 82 and adjusted by the servo link to tune the cavity to resonance at the same frequency to which the preceding cavities have been tuned. Thus, shaft 29 will be turned from its illustrated position to some other position consistent with the tuning afforded by the coarse tuning, the humidity, the temperature of the system, etc. After the last cavity is tuned, sufficient amplitude of the modulated carrier voltage is applied to the isolator, heterodyned and amplified down by the intermediate frequency amplifier to appear at detector 57 above a predetermined level. If this tuning sequence has been successful and no parts or components have failed, there is a satisfactory amplitude to be so gauged by the detector 57, with a resultant energization of the test light 58. This light will go on briefly to indicate the system is operative, whereupon the sequence control shuts down. In shutting down, the reference oscillator 60 is turned off, oscillator 43 is deenergized by switch 64 opening. The tuning and test lamps also are turned off.

Upon the need for testing the system for its state of tuning, actuation of the test line 112 starts sequence control 100 along a slightly different sequence of events. Reference oscillator 60 is energized, as well as the klystron oscillator 43. If the system is in tune, sufficient amplitude of the reference oscillator voltage appears at detector 57 to actuate the test light 58. This indicates that the system is tuned and is completely operative. The operator releases the test line 112, permitting the deenergization of reference oscillator 60, oscillator 43, and the test light.

By this system, a microwave filter is made available which is tunable to a higher degree of precision than previously possible. The precision is determined by the stability and characteristics of a single element, the wavemeter. With some degree of isolation from variations of temperature and humidity, a notably long operating time between readjustments is available with a setting precision determined by the wavemeter. The long range setting precision is directly dependent on the wavemeter.

Although this invention has been described with respect to a particular embodiment thereof, it is not to be so limited because changes and modications may be made therein which are within the full intended scope of the invention as defined by the appended claims.

I claim:

1. In a microwave tuning system having a plurality of cavities coupled in cascade, coarse tuning means and fine tuning means for each of said cavities, a tuning oscillator for applying signal of the frequency to which said cavities are to be tuned, an accurately calibrated wavemeter for determining precisely the frequency of operation of said tuning oscillator, the output of said tuning oscillator being coupled to said wavemeter and to an input cavity of said cascaded cavities, said tuning oscillator having coarse frequency control means and fine frequency control means, shaft positioning means coupled to said wavemeter, said shaft positioning means also being coupled to said coarse tuning means of each of said cavities and to said coarse frequency control means whereby operation of said shaft positioning means to a position that is determined by the calibration of said wavemeter tunes said tuning oscillator and said cavities approximately to the frequency indicated by the selected calibration, a first servo system having a first phase detector connected to said wavemeter and an output connected to said fine frequency control means of said tuning oscillator, said first phase detector being responsive to departure of the frequency of the tuning oscillator signal from said selected calibrated frequency to control said first servo means and thereby to control said fine frequency control means for tuning said tuning oscillator to the frequency of said selected calibration, a second servo means having a second phase detector coupled to said input cavity, timing means for firstly connecting the output of said second servo means to said fine tuning means of said first cavity and then sequentially to said fine tuning means of successive ones of said cavities, and said second phase detector being responsive to phase shift to control said second servo system for tuning said cavities sequentially to the frequency of the signal of said tuning oscillator.

2. A tuning system as claimed in claim 1 in combination with detuning means for each of said cavities other than said first cavity, each of said detuning means operative to detune the respective cavity far from the frequency of the signal of said tuning oscillator, and said timing means operating said detuning means for those cavities succeeding that one of said cavities which is being tuned by operation of said second servo system.

3. A tuning system as claimed in claim 1 having a reference modulation oscillator, said last oscillator being connected to said tuning oscillator for frequency modulating the output signal of said tuning oscillator and also being connected to said first and second phase detectors for supplying signal for phase reference thereto.

References Cited in the file of this patent

UNITED STATES PATENTS

| | | |
|---|---|---|
| 2,376,667 | Cunningham et al. | May 22, 1945 |
| 2,462,857 | Ginzton et al. | Mar. 1, 1949 |
| 2,788,445 | Murray et al. | Apr. 9, 1957 |
| 2,808,509 | Felch et al. | Oct. 1, 1957 |